US005530735A

United States Patent [19]

Gard et al.

[11] Patent Number: 5,530,735

[45] Date of Patent: Jun. 25, 1996

[54] ON-LINE MEASUREMENT OF X-RAY TUBE VOLTAGE IN A CT SYSTEM

[75] Inventors: Michael F. Gard, New Berlin; John M. Sandrik, Wauwatosa, both of Wis.

[73] Assignee: General electric Company, Milwaukee, Wis.

[21] Appl. No.: 364,622

[22] Filed: Dec. 27, 1994

Related U.S. Application Data

[62] Division of Ser. No. 203,953, Mar. 1, 1994, Pat. No. 5,400,387.

[51] Int. Cl.$^{6}$ .................................................... G01D 18/00

[52] U.S. Cl. ............................................ 378/207; 378/112

[58] Field of Search ............................... 378/4, 207, 98.6, 378/98.7, 98.2, 98.8, 108, 109, 110, 111, 19, 112, 116

[56] References Cited

U.S. PATENT DOCUMENTS 5,081,664 1/1992 Lie et al. ................................ 378/207

*Primary Examiner*—David P. Porta
*Assistant Examiner*—Don Wong
*Attorney, Agent, or Firm*—Quarels & Brady

[57] ABSTRACT

A CT system includes a pair of detectors in its detector array which measure x-ray intensity from a source after passing through a differential x-ray filter. The ratio of the signals produced by these two detector elements are input to a KV calculator which produces a signal indicative of x-ray tube voltage.

2 Claims, 2 Drawing Sheets

ON-LINE MEASUREMENT OF X-RAY TUBE VOLTAGE IN A CT SYSTEM

This is a division of application Ser. No. 08/203,953 filed Mar. 1, 1994, now U.S. Pat. No. 5,400,387.

BACKGROUND OF THE INVENTION

The present invention relates to the measurement of x-ray tube voltage and, more particularly, to the measurement of tube voltage in a computed tomography (CT) imaging system.

In a contemporary computed tomography system, an x-ray source projects a fan-shaped beam which is collimated to lie within the X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered back projection technique. This process converts the attenuation measurements from a scan into integers called "CT numbers" or "Hounsfield units", which are used to control the brightness of a corresponding pixel on a cathode ray tube display.

The quality of the image produced by any x-ray machine, and particularly a CT system, is determined in part by the quality of the accelerating voltage applied between the x-ray tube anode and cathode. This voltage is commonly called the peak kilovoltage (KVp) and its value is dependant on the particular machine in which the tube is used. In mammography, for example, better tissue contrast is achieved with relatively low voltages of around 30 KVp, whereas conventional x-ray machines and CT systems employ higher voltages in the range of 80 KVp to 140 KVp. All x-ray machines are subject to errors and image artifacts caused by incorrect tube voltage. CT systems are particularly vulnerable to variations in tube KVp, since they rely on a known KVp to make corrections to the acquired data for phenomena such as beam hardening. Also, special procedures such as bone mineral densitometry require an accurate KVp to provide the desired image contrast reproducibility. The KVp stability (or absolute KVp value) of an x-ray machine may be degraded by such events as long-term component drift, or component stress produced by x-ray tube "spits". As a result, KVp recalibration is performed regularly by service personnel and is a very time consuming task.

Commercial instruments are available which allow measurement of KVp from differential filtration of the x-ray beam, but these instruments are expensive, inconvenient, and are not highly accurate. In addition, available instruments do not allow measurements without service personnel being present to insert the measurement device into the beam, and beam measurements may not be made while the scanner is being used on a patient.

SUMMARY OF THE INVENTION

The present invention relates to an indirect means for measuring the voltage applied to an x-ray tube, and particularly, to the measurement of tube voltage by measuring the x-ray beam itself. The tube voltage measurement apparatus includes two x-ray detectors disposed in the x-ray beam and being operable to generate respective signals that are proportional to the intensity of the x-ray beam impinging thereon, a differential filter disposed over the two x-ray detectors and being operable to attenuate the intensity of x-rays impinging on one x-ray detector significantly more than the x-rays impinging on the other x-ray detector; means for calculating the ratio of the detector signals and, based on that ratio, calculating the x-ray tube voltage as a logarithmic function of the ratio.

A general object of the invention is to provide a highly accurate means for indirectly measuring x-ray tube voltage. It is a discovery of the present invention that, for any given x-ray tube and differential filter, an exponential relationship exists between tube voltage and the ratio of the two detector signals. This relationship is precisely determined by a calibration procedure in which an exponential curve is fit to a set of ratios measured at different, known x-ray tube voltages. Voltage measurements accurate to within ±0.5% are achieved.

Another object of the invention is to provide a tube, voltage measurement apparatus which may be incorporated into an x-ray machine and used while imaging a patient. Once the ratio of the detector signals is calculated, the tube voltage is easily calculated from an equation that reflects the logarithmic relationship or a value is read from a look-up table that stores an approximation of the logarithmic relationship. In principle, this could be performed on line as patient data is acquired, and the calculated tube voltage could be used to control the scanning operation or the image reconstruction process.

GENERAL DESCRIPTION OF THE INVENTION

Figure 5:
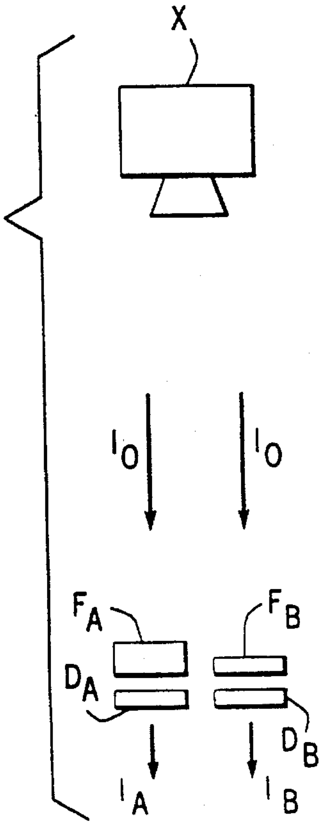
FIG. 5 is a diagram showing x-ray filters, $F_A$, $F_B$, respectively placed before detectors $D_A$, $D_B$.

Referring to FIG. 5, the invention employs two identical x-ray detectors $D_A$ and $D_B$ located behind filters $F_A$ and $F_B$. For CT systems, the filters $F_A$ and $F_B$ may consist of different thicknesses of attenuating material such as copper, tin or molybdenum.

One of the filters may be vanishingly thin (i.e., no additional filter—only air) with no loss of generality. Both detectors are illuminated by a single X-ray source x with identical source-detector path lengths, so that the difference in detected energy is associated only with the presence and characteristics of the two filters. Additionally, the filters are immediately adjacent to the detectors so that scatter from the filter is largely captured by the detector.

The radiation measured at detectors $D_A$ and $D_B$ is determined by several different factors. The tube output has a bremsstrahlung spectrum (the Kramers spectrum) which is well known. This bremsstrahlung spectrum is internal to the tube; the usable spectrum from a typical X-ray tube is produced from the bremsstrahlung after filtration by the tube glass, cooling oil, ultem or similar tube exit port window material, and a thin filter (typically molybdenum or aluminum). The spectrum of the usable X-ray beam produced by the tube unit is determined by the total filtration of these tube elements. This usable beam $I_0$ is then incident on the two filters, $F_A$ and $F_B$, where the beam is attenuated in accordance with well-known principles. Following filtration by $F_A$ and $F_B$, transmitted X-ray photons are converted to optical photons by the detector's scintillator. The number of optical photons generated by an X-ray photon is proportional to X-ray photon energy (that is, a 140 KeV X-ray photon is considered to generate twice as many optical photons as a 70 KeV X-ray photon). X-ray photon capture is not 100% at higher energies, resulting in the phenomenon known as "punchthrough,"which is equivalent to a high-energy transmission loss. Conversion of optical photons to electrical charge in the detector's photodiode is considered to be a linear process. Direct conversion detectors in which x-ray photons directly produce electrical current, will behave in a similar manner.

These factors, as well as the fact that so-called linear attenuation coefficients μ actually change as a function of x-ray energy, present a very complex relationship between the x-ray tube voltage and measured detector intensities $I_A$ and $I_B$.

The filters $F_A$ and $F_B$ will produce two signals with measured intensities $I_A$ and $I_B$ at detectors $D_A$ and $D_B$, respectively. Assume that filters $F_A$ and $F_B$ are of the same material, and also assume that the thickness of $F_A$ is greater than the thickness of $F_B$. Now form the ratio R of the two detector readings $$R = \frac{I_A}{I_B} \tag{1}$$

Under the assumption that the thickness of $F_A$ is greater than the thickness of $F_B$, we see that $I_A \leqq I_B$, and $O \leqq R \leqq I$.

It is an important discovery of the present invention that over the diagnostically useful range of 70 KV≦KV≦150 KV, the relationship between KV and the ratio R fits a simple exponential function of the form $$R = k_0 + k_1 e^{-k_2\ KV} \tag{2}$$

From this, it is a simple matter to determine the applied KV from the measured ratio R by use of the logarithmic relationship $$KV = -\frac{1}{k_2} \ln\left(\frac{R - k_0}{k_1}\right) \tag{3}$$

The values of the constants $k_0$, $k_1$, and $k_2$ must, of course, be determined for each application. These are easily obtained during initial system calibration, when the high voltage generator is initially calibrated. For any given set of filters $F_A$ and $F_B$, the actual KV and measured ratio R corresponding to the KV form the input to a curve fitting program. CT systems are typically calibrated at 80 KV, 100 KV, 120 KV and 140 KV, thereby providing four measurements to be fit to a curve that is determined by three unknowns. A "gradient search" or other suitable method for fitting the curve indicated by equation (2) to the four measurements of R is employed.

Another discovery of the present inventions is that the differential filters $F_A$ and $F_B$ can be chosen such that the same coefficients $k_0$, $k_1$, and $k_2$ can be used with different x-ray tubes. As indicated above, tubes contain a number of elements which attenuate x-rays and which will naturally differ from tube-to-tube due to manufacturing tolerances. If the filters $F_A$ and $F_B$ are selected to have an attenuation significantly greater than the variations in attenuation due to those tube elements, consistent KV measurements can be made even when tubes are changed. Experiments conducted using one filter set of $F_A$=0.6 mm molybdenum and $F_B$=0.2 mm molybdenum over 80 KV to 140 KV operating range of a CT system provided daily KV measurements with a repeatability of approximately 500 ppm (parts per million), or ±0.05%, and a departure from the mean of 0.12% with different tubes. A second filter set $F_A$=0.4 mm molybdenum and $F_B$=0.2 mm molybdenum provided somewhat better results in accuracy but revealed slightly more variation in results due to differences in x-ray tube construction.

DESCRIPTION OF THE PREFERRED EMBODIMENT

Figure 1:
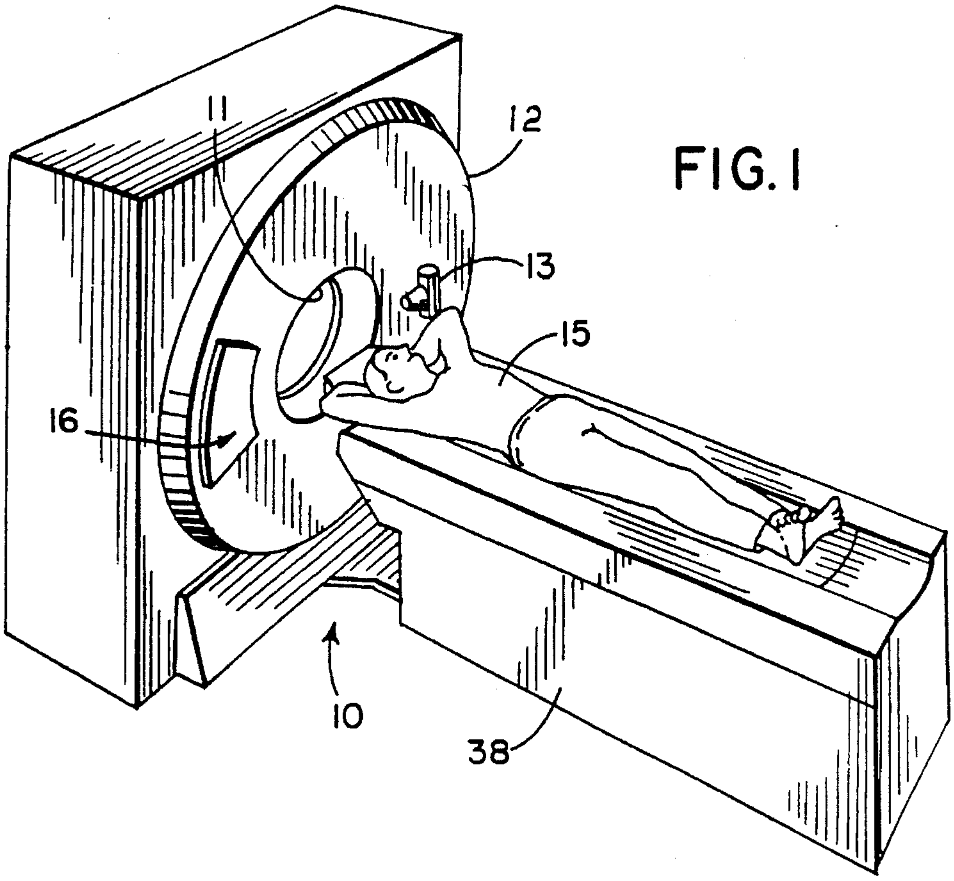
FIG. 1 is a pictorial view of a CT imaging system in which the present invention may be employed.
Figure 2:
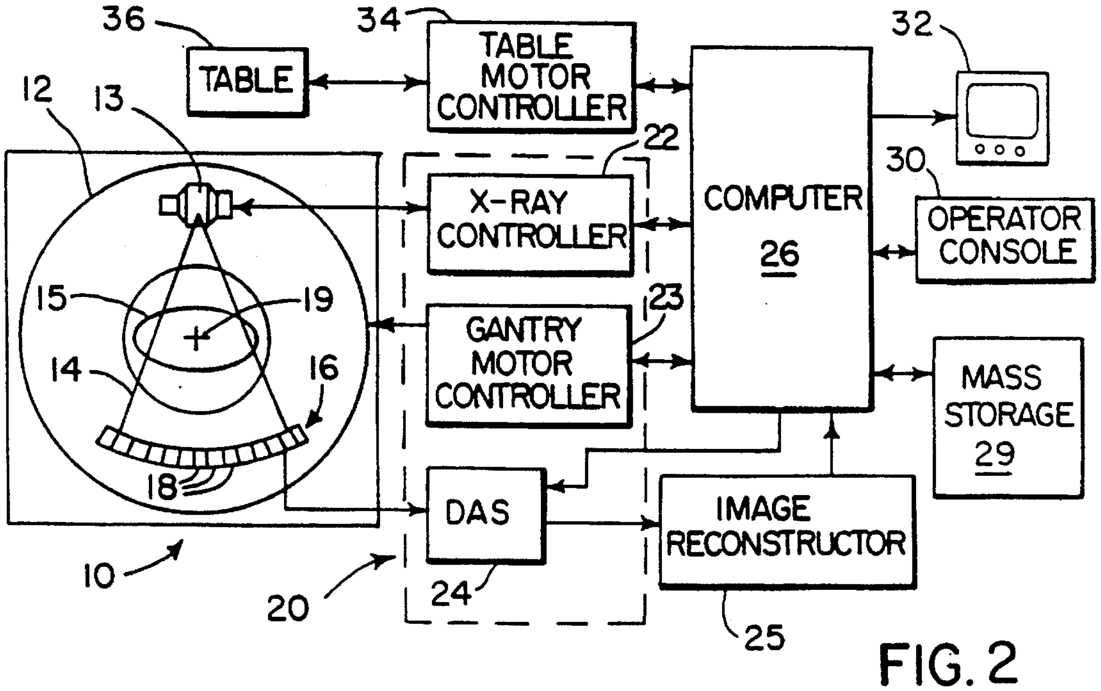
FIG. 2 is a block schematic diagram of the CT imaging system.

With initial reference to FIGS. 1 and 2, a computed tomography (CT) imaging system 10 includes a gantry 12 representative of a "third generation" CT scanner. Gantry 12 has an x-ray source 13 that projects a cone beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes a x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction. The reconstructed image is applied as an input to a computer 26 which stores the image in a mass storage device 29.

The computer 26 also receives commands and scanning parameters from an operator via console 30 that has a keyboard. An associated cathode ray tube display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

Figure 4:
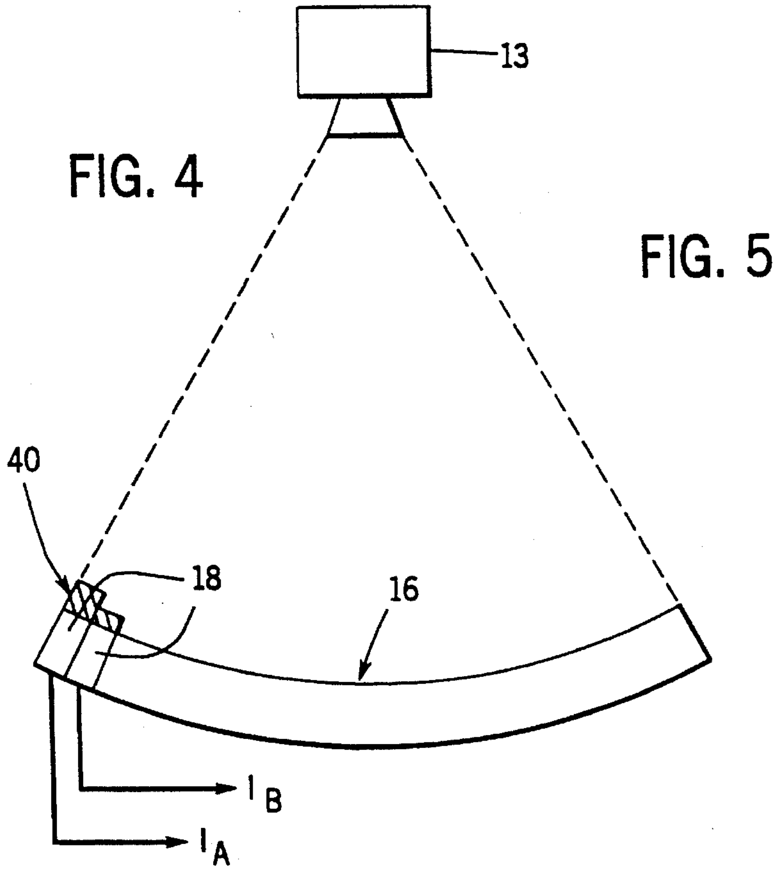
FIG. 4 is a diagram of the filtered x-ray detectors used in the CT imaging system of FIG. 2 to practice the preferred embodiment of the invention.

Referring particularly to FIG. 4, to employ the present invention in this CT imaging system, two detector elements 18 located at one end of the detector array 16 are covered with a differential filter 40. The filter 40 is constructed of molybdenum and it has a thickness of 0.6 mm over the face of one detector element and a thickness of 0.2 mm over the face of the second detector element 18. Other filter materials such as copper may be used and the thickness can be altered. Molybdenum was chosen because it is highly attenuating and can therefore be used in very thin sheets and the 0.2 mm thickness for the less attenuated detector was selected because it was sufficient to minimize the effects of variations in the x-ray tube itself, such as its glass envelope. If such variations were not present, the thin sheet could theoretically be reduced to zero so that the differential filter 40 did not attenuate x-rays reaching one of the two detector elements 18.

Figure 3:
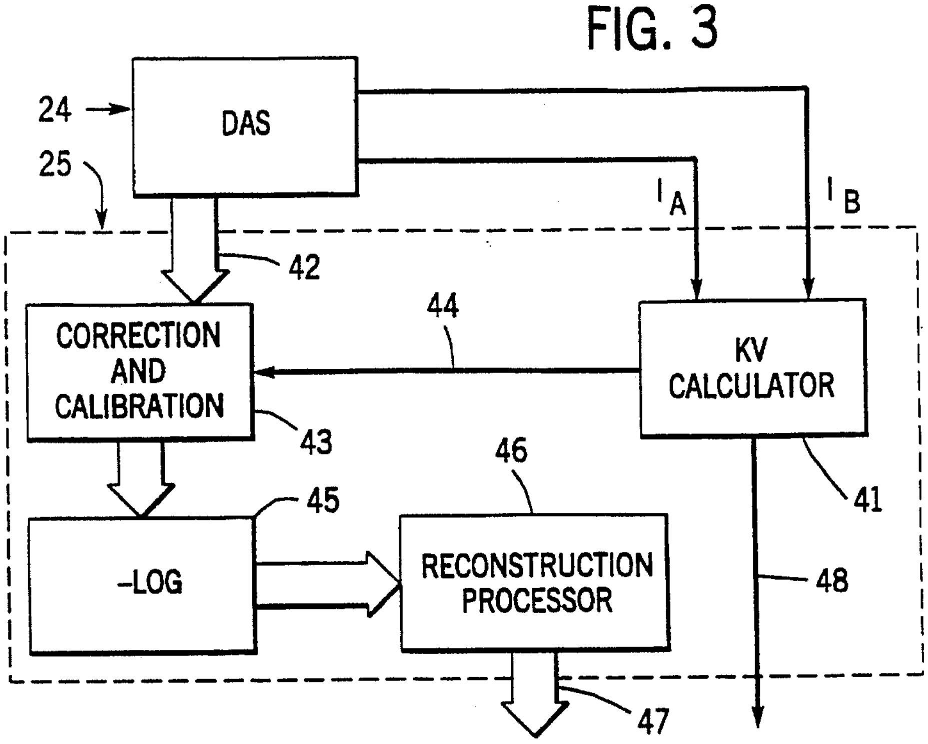
FIG. 3 is a block schematic diagram of the image reconstruction which forms part of the CT imaging system of FIG. 2.

Referring particularly to FIG. 3, as each view is acquired during a scan a set of scan data values which indicate the number of x-ray photons sensed by the detector elements 18 are conveyed by the DAS 24 to the image constructor 25. Two of these intensity values $I_A$ and $I_B$ are produced by the detectors 18 located behind the differential filter 40 and these are applied to a KV calculator 41. The remaining scan data values are applied through a bus 42 to a correction and calibration circuit 43 which adjusts the scan data for various well known errors such as variations in detector and DAS channel gains, dark current offsets and beam hardening. The latter correction is particularly pertinent to the present invention in that it relies on knowledge of the x-ray tube voltage as a basis for calculating accurate corrective values. This information is provided by the KV calculation 41 through line 44. After correction, the scan data is processed in a well known manner by taking the negative of its logarithm at 45 to produce a projection profile for each view. These projection profiles are applied to a reconstruction processor 46 which filters and back projects them to form slice images that are output at 47 to the computer 26.

The KV calculator 41 forms the ratio R of the two detector readings ($I_A/I_B$), and from this ratio the x-ray tube voltage is directly calculated:

$$KV = -\frac{1}{k_2} \ln\left(\frac{R-k_0}{k_1}\right)$$

As indicated above, the constants $k_0$, $k_1$ and $k_2$ are determined during the initial calibration of the CT system, and tests have shown that these constants need not be recalculated even when the x-ray tube 13 is changed. Indeed, these constants are determined primarily by the differential filter 40. The KV value produced by the KV calculator 41 is applied to the corrective circuit 43 as described above, and it may also be applied to the computer 26 through line 48 for use in other imaging applications such as contrast studies, bone mineral densitometry, or refined beam hardening corrections. This signal may also be monitored by service personnel to check high value generator operation either on site, or remotely over the telephone.

While the present invention is particularly well suited for on-line use in an x-ray CT system as described in the preferred embodiment, it may also be used in other x-ray machines. The present invention may also be embodied in a stand alone device which is inserted in the x-ray path of a machine being calibrated for the first time in the factory, or for recalibration of machines in the field. Also, while the logarithmic curve best fits the values of R measured at different tube voltages, these measurements can also be fit to a second order polynomial using a conventional least-squares fit. Also, while the differential filter 40 is shown mounted to the detectors 18 which they cover, the differential filter 40 may be located elsewhere in the x-ray beam. For example, it may be formed as part of the bow tie filter, or other prepatient filter, or it may be a separate element that is inserted in the beam only during calibration scans.

We claim:

1. In a computed tomography imaging system having an x-ray source that projects a beam of x-ray through a subject and a detector array that senses the projected x-ray beam at each of a plurality of views during a scan and produces a set of scan data at each view for an image reconstructor, the improvement comprising:

a pair of x-ray detectors disposed in the beam of x-rays and being operable as the scan data is being produced for each view to produce respective signals $I_A$ and $I_B$ which indicate the intensity of detected x-rays;

a differential filter disposed in the x-ray beam to attenuate the x-ray intensity detected by one of said pair of x-ray detectors by an amount substantially greater than that detected by the other said pair of x-ray detectors;

a voltage calculator connected to receive the detector signals $I_A$ and $I_B$ and calculate a tube voltage value (KV) using the ratio (R) of the detector signals $I_A/I_B$; and correction means for receiving the tube voltage value (KV) and using said value for adjusting the scan data for each view prior to the use of the scan data by said image reconstructor.

2. The improvement as recited in claim 1 in which the pair of x-ray detectors are mounted to the detector array and the differential filter is mounted to said pair of x-ray detectors.

* * * * *